(12) United States Patent
Hong

(10) Patent No.: US 12,393,054 B2
(45) Date of Patent: Aug. 19, 2025

(54) MULTIFOCAL OPHTHALMIC LENS WITH EXTENDED DEPTH-OF-FOCUS

(71) Applicant: Alcon Inc., Fribourg (CH)

(72) Inventor: Xin Hong, Fort Worth, TX (US)

(73) Assignee: Alcon Inc., Fribourg (CH)

( * ) Notice: Subject to any disclaimer, the term of this patent is extended or adjusted under 35 U.S.C. 154(b) by 468 days.

(21) Appl. No.: 17/819,973

(22) Filed: Aug. 16, 2022

(65) Prior Publication Data

US 2024/0061271 A1    Feb. 22, 2024

Related U.S. Application Data

(60) Provisional application No. 63/238,835, filed on Aug. 31, 2021.

(51) Int. Cl.
*G02C 7/02* (2006.01)

(52) U.S. Cl.
CPC ................... *G02C 7/022* (2013.01)

(58) Field of Classification Search
CPC .......... G02C 7/022; G02C 7/06; G02C 7/044; G02C 2202/20; G02C 2202/22
USPC .................................................... 351/159.41
See application file for complete search history.

(56) References Cited

U.S. PATENT DOCUMENTS

| | | |
|---|---|---|
| 8,241,354 B2 | 8/2012 | Hong et al. |
| 9,335,564 B2 | 5/2016 | Choi et al. |
| 9,770,326 B2 | 9/2017 | Bradley et al. |
| 9,968,440 B2 | 5/2018 | Hong et al. |
| 10,420,638 B2 | 9/2019 | Hong et al. |
| 10,426,599 B2 | 10/2019 | Choi et al. |
| 2009/0195748 A1* | 8/2009 | Bandhauer ............ G02C 7/044 623/6.3 |
| 2012/0140166 A1 | 6/2012 | Zhao |
| 2013/0044289 A1 | 2/2013 | Zalevsky et al. |
| 2014/0168602 A1 | 6/2014 | Weeber |
| 2017/0239038 A1* | 8/2017 | Choi ..................... G02C 7/049 |
| 2018/0147052 A1 | 5/2018 | Hong et al. |
| 2019/0307553 A1* | 10/2019 | Hong ..................... G02C 7/042 |
| 2020/0121448 A1 | 4/2020 | Choi et al. |

OTHER PUBLICATIONS

Kanclertz, Piotr et al., "Extended Depth-of-Field Intraocular Lenses: An Update", Asia-Pacific Journal of Opthalmology, 9:3, May 1, 2020, pp. 194-202.

* cited by examiner

*Primary Examiner* — William R Alexander
(74) *Attorney, Agent, or Firm* — PATTERSON + SHERIDAN, LLP

(57) ABSTRACT

An ophthalmic lens includes an optic having a first surface and a second surface disposed about an optical axis. At least one of the first surface and the second surface includes a surface profile having a base curvature and a plurality of zones. The base curvature corresponds to a base optical power. The plurality of zones is adapted to produce a plurality of curves corresponding to light energy distribution along the optical axis. The surface profile includes a plurality of adjustments providing an extended depth-of-focus, the plurality of adjustments being adapted to extend each one of the plurality of curves towards another of the plurality of curves. The plurality of adjustments may include at least one spherical aberration. The plurality of adjustments may include at least one longitudinal chromatic aberration. The plurality of adjustments may include at least one phase shift change.

16 Claims, 3 Drawing Sheets

MULTIFOCAL OPHTHALMIC LENS WITH EXTENDED DEPTH-OF-FOCUS

PRIORITY CLAIM

This application claims the benefit of priority of U.S. Provisional Patent Application Ser. No. 63/238,835 titled "MULTIFOCAL OPHTHALMIC LENS WITH EXTENDED DEPTH-OF-FOCUS," filed on Aug. 31, 2021, whose inventor is Xin Hong, which is hereby incorporated by reference in its entirety as though fully and completely set forth herein.

TECHNICAL FIELD

The disclosure relates generally to a multifocal ophthalmic lens having an extended depth-of-focus.

BACKGROUND

Humans have five basic senses: sight, hearing, smell, taste, and touch. Sight gives us the ability to visualize the world around us and connects us to our surroundings. Many people worldwide have issues with quality of vision and require the use of ophthalmic lenses. For example, as the human eye ages, its ability to adapt in order to view objects at different distances declines. An ophthalmic lens may be worn in front of the eye and/or may be implanted into the eye. Multifocal lenses are often used to provide correction at different focal lengths. However, visual irregularities may result, partially due to distinctive defocused images coexisting with sharply focused images with a multifocal lens.

SUMMARY

Disclosed herein is an ophthalmic lens with an optic having a first surface and a second surface disposed about an optical axis. At least one of the first surface and the second surface includes a surface profile having a base curvature and a plurality of zones. The base curvature corresponds to a base optical power. The plurality of zones is adapted to produce a plurality of curves corresponding to light energy distribution along the optical axis. The surface profile includes a plurality of adjustments providing an extended depth-of-focus, the plurality of adjustments being adapted to extend each one of the plurality of curves towards another of the plurality of curves.

The plurality of adjustments may include at least one spherical aberration. The plurality of adjustments may include at least one longitudinal chromatic aberration. The plurality of adjustments may include at least one phase shift change.

More generally, in some embodiments, an ophthalmic lens may include an optic having a first surface and a second surface disposed about an optical axis, wherein at least one of the first surface and the second surface includes a surface profile having a base curvature and a plurality of zones. The base curvature may correspond to a base optical power, and the plurality of zones may be adapted to produce a plurality of curves corresponding to light energy distribution along the optical axis. The surface profile may further include a plurality of adjustments providing an extended depth-of-focus, the plurality of adjustments being adapted to extend each one of the plurality of curves towards another of the plurality of curves. In some embodiments, the plurality of adjustments may include at least one spherical aberration, at least one longitudinal chromatic aberration, and/or at least one phase shift change. In some embodiments, the plurality of curves may include a near curve, a distance curve, and an intermediate curve between the near curve and the distance curve along the optical axis, and the plurality of zones may be adapted to produce a near correction via the near curve, a distance correction via the distance curve, and an intermediate correction via the intermediate curve. In some embodiments, the plurality of adjustments may include a first adjustment adapted to extend the distance curve towards the intermediate curve, a second adjustment adapted to extend the intermediate curve towards the distance curve, and a third adjustment adapted to extend the near curve towards the intermediate curve.

In further example embodiments, an ophthalmic lens may include an optic having a first surface and a second surface disposed about an optical axis, wherein at least one of the first surface and the second surface may include a surface profile having a base curvature and a plurality of zones. The base curvature may correspond to a base optical power, and the plurality of zones may be adapted to produce a near correction via a near curve, a distance correction corresponding to the base optical power via a distance curve, and an intermediate correction via an intermediate curve between the near curve and the distance curve along the optical axis. The surface profile may further include a plurality of adjustments providing an extended depth-of-focus, the plurality of adjustments including a first adjustment adapted to extend the distance curve towards the intermediate curve, a second adjustment adapted to extend the intermediate curve towards the distance curve, and a third adjustment adapted to extend the near curve towards the intermediate curve.

The above features and advantages and other features and advantages of the present disclosure are readily apparent from the following detailed description of the best modes for carrying out the disclosure when taken in connection with the accompanying drawings.

DETAILED DESCRIPTION

Figure 1:
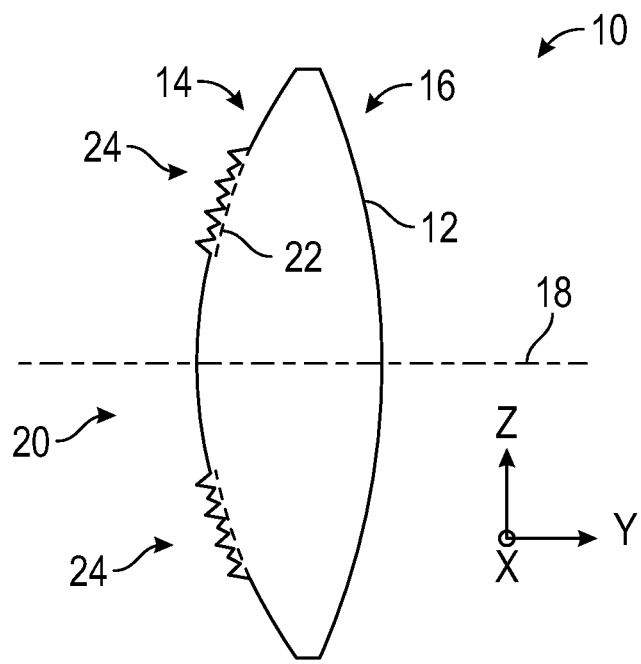
FIG. 1 is a schematic sectional view of an ophthalmic lens with extended depth-of-focus.

Referring to the drawings, wherein like reference numbers refer to like components, FIG. 1 schematically illustrates an ophthalmic lens 10 composed of an optic 12 having a first surface 14 and a second surface 16 disposed about an optical axis 18. The first surface 14 may be the anterior surface or the posterior surface. Conversely, the second surface 16 may be the posterior surface or the anterior surface. The ophthalmic lens 10 is radially symmetric about the optical axis 18. The ophthalmic lens 10 may be an intraocular lens, a contact lens, a spectacle lens or other type of corrective lens. As will be described below, the ophthalmic lens 10 is a multifocal lens that provides technical advantages of easier refraction targeting, more continuous vision and fewer visual disturbances.

Figure 2:
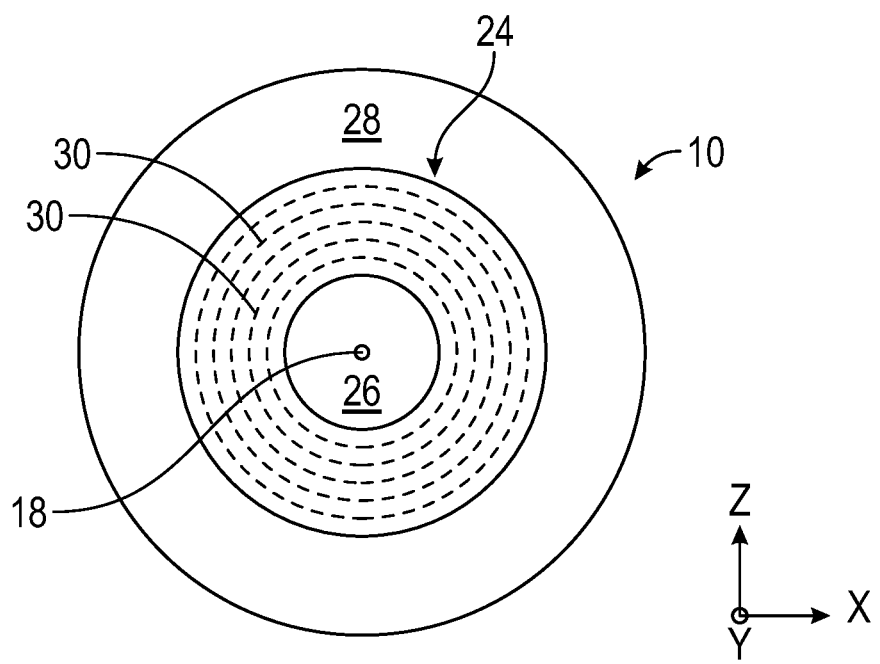
FIG. 2 is a schematic top view of the ophthalmic lens of FIG. 1.

Referring to FIG. 1, the optic 12 defines a surface profile 20 having a base curvature 22 and a plurality of zones 24. The surface profile 20 may be incorporated on at least one of the first surface 14 and the second surface 16. FIG. 2 is a schematic top view of the ophthalmic lens 10. The plurality of zones 24 may extend between an inner region 26 and an outer region 28. Referring to FIG. 2, the plurality of zones 24 may be structured as respective power regions or annular rings 30 adapted to differentially interact with incident light, e.g. via refraction and/or diffraction. The annular rings 30 may extend from the base curvature 22 (along the Y-axis) with different step heights, between a minimum height and a maximum height. The areas of the annular rings 30 may vary in a controlled manner as a function of distance from the optical axis 18. The plurality of zones 24 may be adapted to interact with incident light of different wavelengths.

Referring to FIG. 1, the base curvature 22 corresponds to a base optical power. The shape of the base curvature 22 may be varied and may include a generally convex shape, a generally concave shape, a generally plano-concave or a plano-convex shape. The base curvature 22 may be different in different zones. The optic 12 may include one or more structural support members (not shown) and other components that are not shown. In one example, the optic 12 is formed from a soft acrylic material, such as a copolymer of acrylate and methacrylate, or of hydrogel or silicone. Any biocompatible material having a sufficient index of refraction may be employed to form the optic 12.

Figure 3:
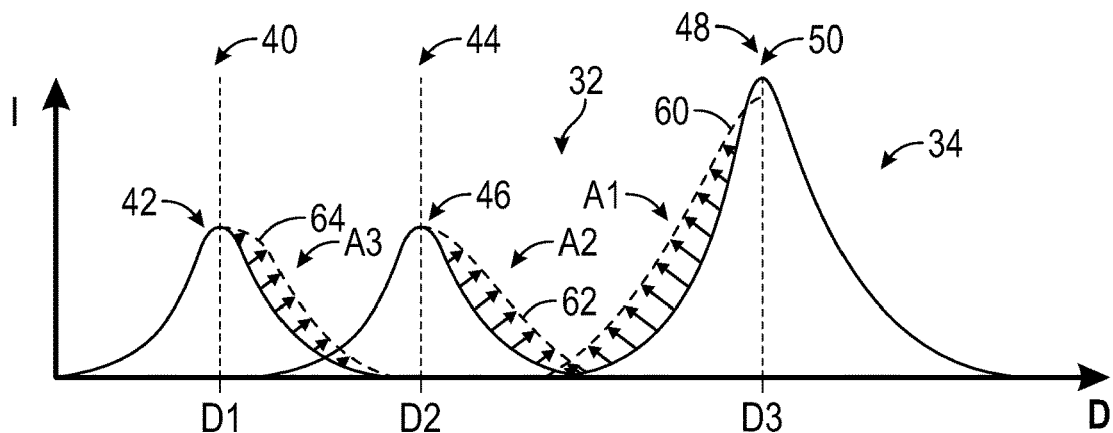
FIG. 3 is a schematic graph of intensity distribution over distance (along the optical axis) for an example ophthalmic lens.

FIGS. 3-6 show graphs of intensity distribution I (on the vertical axis) over distance D (on the horizontal axis) along the optical axis 18 for the ophthalmic lens 10. Referring to FIG. 3, the ophthalmic lens 10 includes a plurality of adjustments 32 providing an extended depth-of-focus. The plurality of zones 24 of FIGS. 1-2 is adapted to produce a plurality of curves 34 (see FIG. 3) corresponding to light energy distribution along the optical axis 18. In the example shown, the plurality of zones 24 is adapted to provide a trifocal correction. In other embodiments, the ophthalmic lens 10 may provide a bifocal correction. Alternatively, the ophthalmic lens 10 may provide a quadrifocal correction.

Referring to FIG. 3, the plurality of zones 24 (see FIGS. 1-2) may be adapted to provide a near correction 40 via an original near curve 42 having a respective peak at a first distance D1 on the optical axis 18. An intermediate correction 44 may be provided via an original intermediate curve 46 having a respective peak at a second distance D2. A distance correction 48 may be provided via an original distance curve 50 having a respective peak at a third distance D3 on the optical axis 18. The distance correction 48 may correspond to the base optical power. In a non-limiting example, the near correction 40 may correspond to vision at 30-50 cm, and the intermediate correction 44 may correspond to vision at 50-70 cm. Alternatively, the optic 12 may be designed for a non-dominant eye with a base optical power that is slightly less than the corresponding distance power, in order to improve overall binocular vision for both eyes.

Referring to FIG. 3, a plurality of adjustments 32 is adapted to extend each one of the plurality of curves 34 towards another of the plurality of curves 34. Referring to FIG. 3, a first adjustment A1 is adapted to extend the original distance curve 50 to a modified distance curve 60, in a direction towards the original intermediate curve 46. A second adjustment A2 is adapted to extend the original intermediate curve 46 to a modified intermediate curve 62, in a direction towards the original distance curve 50. Referring to FIG. 3, a third adjustment A3 is adapted to extend the original near curve 42 to a modified near curve 64, in a direction towards the original intermediate curve 46. As shown in FIG. 3, the respective peaks of the modified near curve 64, modified intermediate curve 62 and modified distance curve 60 may remain at the first distance D1, second distance D2 and third distance D3, respectively, along the optical axis 18.

Figure 7:
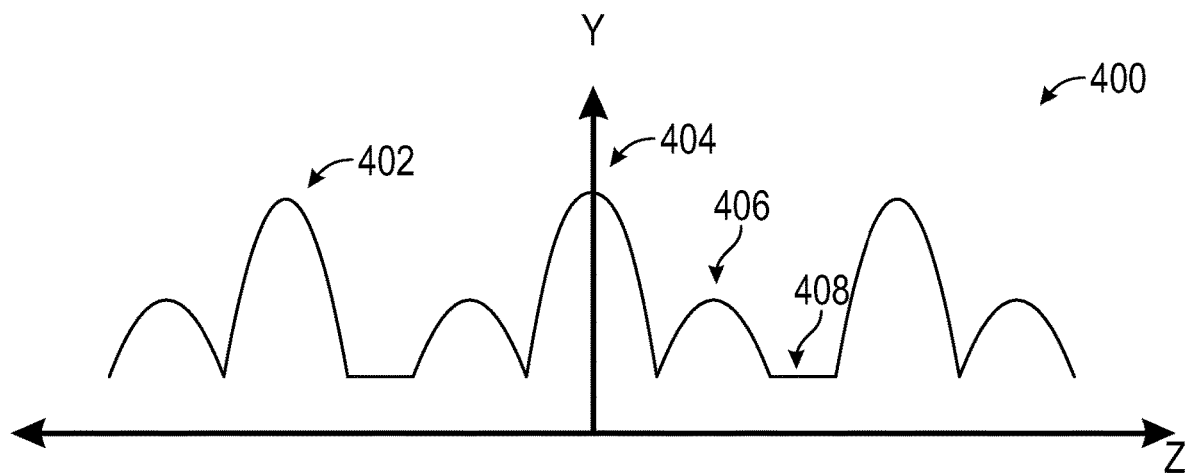
FIG. 7 is a schematic fragmentary side view of a refractive structure that may be employed in the ophthalmic lens of FIG. 1.

The ophthalmic lens 10 may be a refractive multifocal. An example of a refractive trifocal profile 400 of a refractive structure, having a plurality of steps 402, is shown in FIG. 7. The optical step height of each step is the physical height multiplied by the difference between the index of refraction of the ophthalmic lens 10 and the index of refraction of the surrounding media in which the ophthalmic lens 10 is to be used. Referring to FIG. 7, the plurality of steps 402 defines respective power regions adapted to refract incident light. It is understood that the physical height, pattern and spacing of the plurality of steps 402 may be varied based on the application at hand. In the example shown, the first region 404 may provide near correction 40, the second region 406 may provide intermediate correction 44 and the third region 408 may provide distance correction 48.

Figure 8:
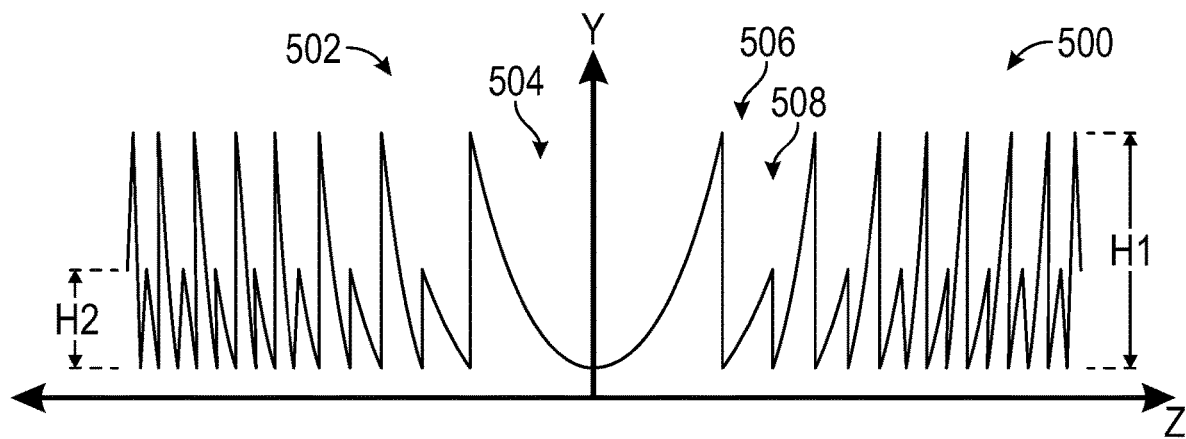
FIG. 8 is a schematic fragmentary side view of a diffractive structure that may be employed in the ophthalmic lens of FIG. 1.

The ophthalmic lens 10 may be a diffractive multifocal. An example of a diffractive trifocal profile 500, having a plurality of steps 502, is shown in FIG. 8. As noted above, the optical step height of each step is the physical height multiplied by the difference between the index of refraction of the ophthalmic lens 10 and the index of refraction of the surrounding media in which the ophthalmic lens 10 is to be used. For an achromatized structure, the optical step height of the steps is greater than the wavelength of light and not more than twice the wavelength of light. In other words, $\lambda \leq \Delta n \cdot H \leq 2\lambda$, where H is the physical height of the respective steps, $\lambda$ is the wavelength of light for which the zone is configured and $\Delta n$ is the difference in the index of refraction. For a non-achromatized structure, the optical step height of the steps is between 0 and the wavelength of light, or between $0 \leq \Delta n \cdot H \leq \lambda$. It is understood that the physical height, pattern and spacing of the plurality of steps 502 may be respectively varied based on the application at hand.

In the example shown, the first region 504 may provide near correction 40, second region 506 (having a height H1) may provide intermediate correction 44 and third region 508 (having a height H2) may provide distance correction 48. In one example, the diameters for the annular rings 30 are set by a Fresnel diffractive lens criteria. The diffractive steps may be apodized (gradually declining in step height relative to a reference) in order to reduce glare.

Figure 4:
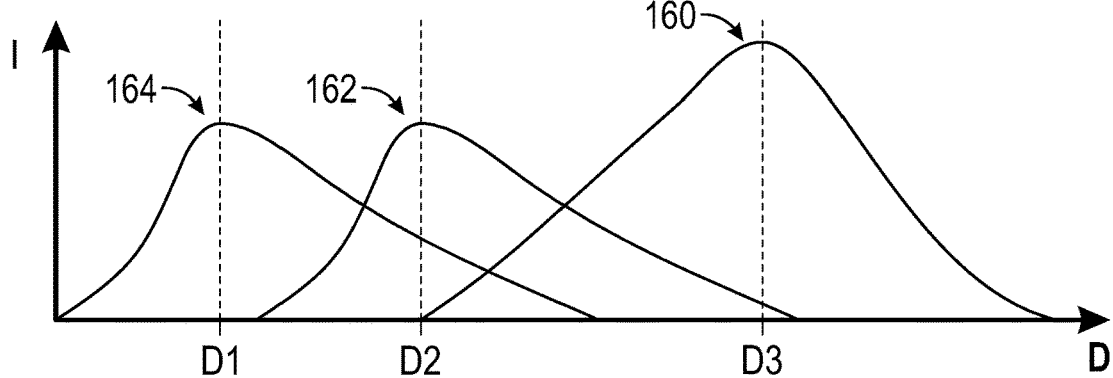
FIG. 4 is a schematic graph of intensity distribution over distance for the ophthalmic lens of FIG. 1, with a plurality of adjustments in accordance with a first embodiment.

The plurality of adjustments 32 of FIG. 3 may be structured in a number of ways. FIG. 4 shows a modified distance curve 160, a modified intermediate curve 162 and a modified near curve 164, in accordance with a first embodiment. In this embodiment, the first adjustment A1 includes a negative spherical aberration, the second adjustment A2 includes a positive spherical aberration, and the third adjustment A3 includes a positive spherical aberration. If the ophthalmic lens 10 is a refractive multifocal, this may be accomplished by changing the asphericity in the corresponding power regions or annular rings 30.

If the ophthalmic lens 10 is a diffractive multifocal, the first adjustment A1 (see FIG. 3) may include varying an asphericity of the base curvature 22 (see FIG. 1) for the distance correction 48 (see FIG. 3). Referring to FIG. 2, the annular rings 30 may be adapted to diffract an incident light into a plurality of diffractive orders defined by respective polynomials. The second adjustment A2 and the third adjustment A3 may include varying the respective polynomials of the annular rings 30. In one example, a square of the radius ($R_i$) of a diffractive zone is defined by the following relation:

$$R_i^2 = [(2i+I)\lambda f + g(i)], \text{ and } g(i) = [(ai^2 + bi)f].$$

Here i is a zone number, $\lambda$ is a design wavelength, g(i) is a non-constant function of i, a is a first scaling parameter, b is a second scaling parameter, and f is the focal length of the near correction 40. Varying the respective polynomials of the annular rings 30 may include adjusting the magnitude of one or both of the first scaling parameter a and the second scaling parameters b in order to achieve the desired amount of extension.

The spherical aberration manipulation may be adapted to have a similar effect on the near correction 40 and the intermediate correction 44 in a diffractive structure, such that the modified near curve 164 of FIG. 4 is similar to the modified intermediate curve 162. The surface profile 20 may include a partial aperture diffractive structure, with a refractive power compensator incorporated into the base curvature 22 to neutralize the base diffractive power.

Figure 5:
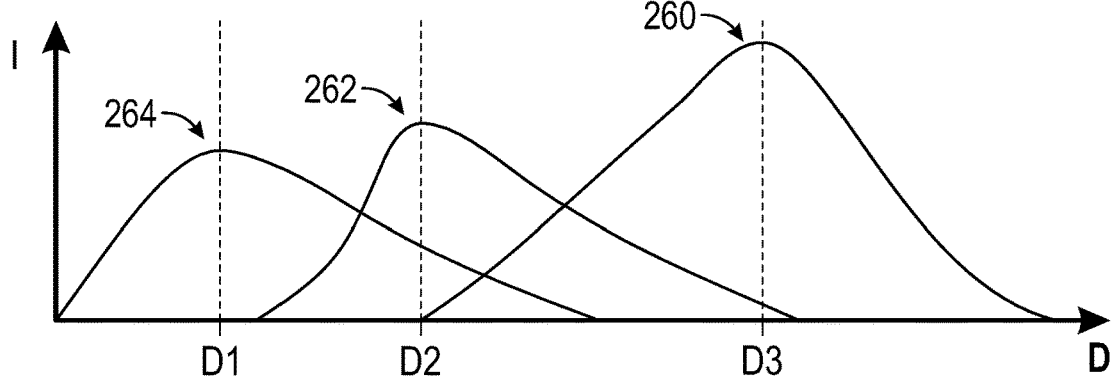
FIG. 5 is a schematic graph of intensity distribution over distance for the ophthalmic lens of FIG. 1, with a plurality of adjustments in accordance with a second embodiment.

Referring now to FIG. 5, a modified distance curve 260, a modified intermediate curve 262 and a modified near curve 264 are shown, in accordance with a second embodiment. In this embodiment, the first adjustment A1 includes a positive longitudinal chromatic aberration. The second adjustment A2 and the third adjustment A3 include a respective negative longitudinal chromatic aberration.

In a diffractive multifocal, this may be achieved by the negative chromatic aberration associated with diffractive powers; the higher the diffractive order, the more negative the longitudinal chromatic aberration. The distance correction 48 will have a positive longitudinal chromatic aberration. Referring to FIG. 5, the modified near curve 264 may be lower and wider than the modified intermediate curve 262 since there is more chromatic aberration with higher diffractive orders. Selection of the appropriate diffractive orders for the distance correction 48, intermediate correction 44 and near correction 40 may be optimized to achieve the desired amounts of extension in a particular application. In some embodiments, the first diffractive order is used for distance correction 48, the second diffractive order is used for intermediate correction 44 and the third diffractive order is used for near correction 40. In some embodiments, the first diffractive order is used for distance correction 48, while the second diffractive order is empty, the third diffractive order is used for intermediate correction 44 and the fourth diffractive order is used for near correction 40. In other embodiments, the first diffractive order is used for distance correction 48, the second diffractive order may be used for intermediate correction 44, while the third diffractive order is empty and the fourth diffractive order is used for near correction 40. In other embodiments, different diffractive orders may be used for different focal ranges.

Figure 6:
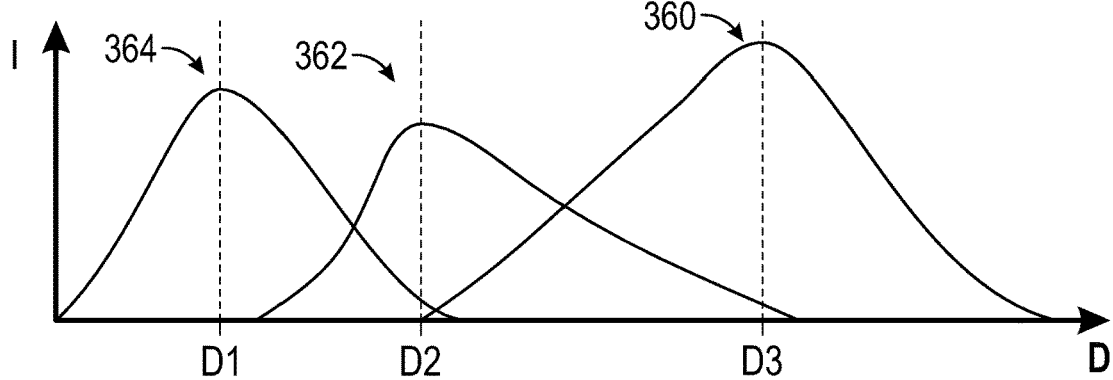
FIG. 6 is a schematic graph of intensity distribution over distance for the ophthalmic lens of FIG. 1, with a plurality of adjustments in accordance with a third embodiment.

Referring now to FIG. 6, a modified distance curve 360, a modified intermediate curve 362 and a modified near curve 364 are shown, in accordance with a third embodiment. In this embodiment, the first adjustment A1 includes a negative phase shift. The second adjustment A2 and the third adjustment A3 each include a positive phase shift. The negative phase shift may correspond to a bounded phase p and a design wavelength $\lambda$, such that $-0.5\lambda \leq p < 0$. The positive phase shift may correspond to the bounded phase p and the design wavelength $\lambda$, such that $0 < p \leq 0.5\lambda$.

Referring to FIGS. 1 and 2, the plurality of zones 24 includes respective power regions or annular rings 30 adapted to interact with incident light. In the third embodiment (FIG. 6), if the ophthalmic lens 10 is a refractive multifocal, the plurality of adjustments 32 includes varying respective phase shift step heights in the respective power regions. In order to optimize the near correction 40, referring to FIG. 6, the ophthalmic lens 10 may be adapted such that the modified near curve 364 is relatively higher (with a relatively narrower width) than the modified intermediate curve 362.

In the third embodiment (FIG. 6), if the ophthalmic lens 10 is a diffractive multifocal, the plurality of adjustments 32 includes selecting a single or multiple phase shift step heights such that it has a negative value when a diffractive order for distance correction 48 is considered and respective positive values when diffractive order for intermediate correction 44 and near correction 40 is considered. In other words, the plurality of adjustments 32 may include varying phase shift step heights to have a respective negative value for the modified distance curve 360 and a respective positive value for the modified intermediate curve 362 and the modified near curve 364.

In summary, the ophthalmic lens 10 provides a broad range of continuous vision by extending each of a plurality of curves 34 towards another of the plurality of curves 34. The ophthalmic lens 10 improves distance refraction targeting by broadening the distance correction 48. Additionally, the smoothing of defocused images and focused image towards each other minimizes visual disturbances.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:
1. An ophthalmic lens comprising:
   an optic having a first surface and a second surface disposed about an optical axis;
   wherein at least one of the first surface and the second surface includes a surface profile having a base curvature and a plurality of zones, the base curvature corresponding to a base optical power;

wherein the plurality of zones is adapted to produce a plurality of curves corresponding to light energy distribution along the optical axis, the plurality of curves including a near curve, a distance curve, and an intermediate curve between the near curve and the distance curve along the optical axis, and the plurality of zones adapted to produce a near correction via the near curve, a distance correction via the distance curve, and an intermediate correction via the intermediate curve, the distance correction corresponding to the base optical power;

wherein the surface profile includes a plurality of adjustments providing an extended depth-of-focus, the plurality of adjustments being adapted to extend each one of the plurality of curves towards another of the plurality of curves, the plurality of adjustments including a first adjustment adapted to extend the distance curve towards the intermediate curve, a second adjustment adapted to extend the intermediate curve towards the distance curve, and a third adjustment adapted to extend the near curve towards the intermediate curve; and wherein the first adjustment includes a negative spherical aberration, and the second adjustment and the third adjustment each include a respective positive spherical aberration.

2. The ophthalmic lens of claim 1, wherein:
the plurality of adjustments includes at least one spherical aberration.

3. The ophthalmic lens of claim 1, wherein:
the plurality of adjustments includes at least one longitudinal chromatic aberration.

4. The ophthalmic lens of claim 1, wherein:
the plurality of adjustments includes at least one phase shift change.

5. The ophthalmic lens of claim 1, wherein:
the plurality of zones includes respective power regions adapted to refract an incident light; and
the first adjustment, the second adjustment and the third adjustment each include varying an asphericity of the respective power regions.

6. The ophthalmic lens of claim 1, wherein:
the plurality of zones includes annular rings adapted to diffract an incident light, the annular rings defined by respective polynomials;
the first adjustment includes varying an asphericity of the base curvature for the distance correction; and
the second adjustment and the third adjustment include varying the respective polynomials.

7. The ophthalmic lens of claim 1, wherein:
the first adjustment includes a positive longitudinal chromatic aberration; and
the second adjustment and the third adjustment each include a respective negative longitudinal chromatic aberration.

8. The ophthalmic lens of claim 7, wherein:
the plurality of zones includes annular rings adapted to diffract an incident light, the annular rings defined by respective polynomials; and
the plurality of adjustments includes varying the respective polynomials.

9. The ophthalmic lens of claim 1, wherein:
the first adjustment includes a negative phase shift, and the second adjustment and the third adjustment each include a positive phase shift.

10. The ophthalmic lens of claim 9, wherein:
the negative phase shift corresponds to a bounded phase p and a design wavelength $\lambda$, such that $-0.5\lambda \leq p < 0$; and
the positive phase shift corresponds to the bounded phase p and the design wavelength $\lambda$, such that $0 < p \leq 0.5\lambda$.

11. The ophthalmic lens of claim 10, wherein:
the plurality of zones includes respective power regions adapted to refract an incident light; and
the plurality of adjustments includes varying respective phase shift step heights in the respective power regions.

12. The ophthalmic lens of claim 10, wherein:
the plurality of zones includes annular rings adapted to diffract an incident light into a plurality of diffractive orders defined by respective polynomials; and
the plurality of adjustments includes varying phase shift step heights to have a respective negative value for the distance curve and a respective positive value for the intermediate curve and the near curve.

13. An ophthalmic lens comprising:
an optic having a first surface and a second surface disposed about an optical axis, the optic being an intraocular lens;
wherein at least one of the first surface and the second surface includes a surface profile having a base curvature and a plurality of zones, the base curvature corresponding to a base optical power;
wherein the plurality of zones is adapted to produce a near correction via a near curve, a distance correction via a distance curve, and an intermediate correction via an intermediate curve between the near curve and the distance curve along the optical axis, the distance correction corresponding to the base optical power;
wherein the surface profile includes a plurality of adjustments providing an extended depth-of-focus, the plurality of adjustments including a first adjustment adapted to extend the distance curve towards the intermediate curve, a second adjustment adapted to extend the intermediate curve towards the distance curve, and a third adjustment adapted to extend the near curve towards the intermediate curve; and
wherein the first adjustment includes a positive longitudinal chromatic aberration, and the second adjustment and the third adjustment include a respective negative longitudinal chromatic aberration.

14. The ophthalmic lens of claim 13, wherein:
the first adjustment includes a negative spherical aberration; and
the second adjustment and the third adjustment each include a respective positive spherical aberration.

15. The ophthalmic lens of claim 13, wherein:
the first adjustment includes a negative phase shift, and the second adjustment and the third adjustment each include a positive phase shift.

16. An ophthalmic lens comprising:
an optic having a first surface and a second surface disposed about an optical axis;
wherein at least one of the first surface and the second surface includes a surface profile having a base curvature and a plurality of zones, the base curvature corresponding to a base optical power;
wherein the plurality of zones is adapted to produce a near correction via a near curve, a distance correction via a distance curve, and an intermediate correction via an intermediate curve between the near curve and the distance curve along the optical axis, the distance correction corresponding to the base optical power;

wherein the surface profile includes a plurality of adjustments providing an extended depth-of-focus, the plurality of adjustments including a first adjustment adapted to extend the distance curve towards the intermediate curve, a second adjustment adapted to extend the intermediate curve towards the distance curve, and a third adjustment adapted to extend the near curve towards the intermediate curve; and wherein the first adjustment includes a negative phase shift, and the second adjustment and the third adjustment each include a positive phase shift.

* * * * *